United States Patent [19]

Knabe et al.

[11] 4,184,003

[45] Jan. 15, 1980

[54] STABLE HECTOGRAPH COMPOSITIONS, TRANSFER ELEMENTS AND PROCESSES

[75] Inventors: Herbert Knabe, Centereach; Allan T. Schlotzhauer, Glen Cove, both of N.Y.; Michael A. Scott, London, England

[73] Assignee: Columbia Ribbon & Carbon Mfg. Co., Inc., Plainview, N.Y.

[21] Appl. No.: 784,300

[22] Filed: Apr. 4, 1977

[51] Int. Cl.[2] .......................... C09D 3/18; C09K 3/00; C08L 1/28

[52] U.S. Cl. ...................................... 428/411; 101/468; 106/14.5

[58] Field of Search ..................... 106/14.5, 26, 32, 28; 101/468, 473; 428/411

[56] References Cited

U.S. PATENT DOCUMENTS

| | | | |
|---|---|---|---|
| 3,036,924 | 5/1962 | Newman | 106/14.5 |
| 3,177,066 | 4/1965 | Newman et al. | 106/26 X |
| 3,515,590 | 6/1970 | Lazzarini et al. | 106/26 X |
| 3,695,912 | 10/1972 | Laurentis et al. | 106/26 X |
| 3,767,450 | 10/1973 | Popiolek | 106/26 X |

FOREIGN PATENT DOCUMENTS

| | | | |
|---|---|---|---|
| 270309 | 9/1963 | Australia | 106/26 |
| 833631 | 7/1956 | United Kingdom . | |
| 973362 | 10/1964 | United Kingdom . | |

*Primary Examiner*—Allan Lieberman
*Attorney, Agent, or Firm*—Thomas L. Tully

[57] ABSTRACT

Solvent hectograph compositions which are resistant to rapid thickening and gelling during storage in the presence of ambient humidity comprising a cellulose ether film-forming binder material, at least one oleaginous material which is substantially incompatible with said binder material and a major amount by weight of particulate spirit-soluble solid hectograph imaging material, the volatile solvent for said binder material being a lower aliphatic ester which is a substantial non-solvent for said imaging material and which has a partial miscibility with water, the process of making such compositions and the process of producing pressure-sensitive transfer elements from said compositions.

10 Claims, No Drawings

STABLE HECTOGRAPH COMPOSITIONS, TRANSFER ELEMENTS AND PROCESSES

Solvent hectograph compositions and pressure-sensitive transfer sheets coated therewith have been proposed for several years as replacements for the more conventional hot-melt hectograph compositions and transfer elements. Such solvent compositions include resinous binder materials in place of wax binder materials, and volatile organic solvents as vehicles to maintain the compositions at a suitable viscosity for coating onto a flexible foundation such as paper or plastic film. Reference is made to U.S. Patents 3,177,086 and 3,767,450 and to British Patents 833,631 and 973,362 as representative of various solvent hectograph compositons and transfer elements.

Among the problems encountered with prior-known solvent hectograph compositions are the government regulations which now preclude or restrict the use of certain volatile solvents as dangerous to the health of workers, such as the chlorinated aliphatics, or as pollutants to the atmosphere, such as aromatic hydrocarbon materials including toluene and xylene. However a more technical problem over the years has been the instability of solvent hectograph compositions based upon cellulose ether binder materials whereby such compositions undergo an increase in viscosity and become gelled after a fairly short period of time, frequently one or two days, so that they are no longer coatable. Thus they had to be prepared in small batches capable of being used immediately, and the coating procedure could not be interrupted for long periods of time for equipment repair without possible gelling of the composition in the ink pan on the apparatus. Their poor shelf life is caused by the absorption of ambient moisture from the atmosphere, which moisture apparently causes a swelling and thickening of the cellulose ether binder material and/or a plasticizing action between the oily ink vehicles and the binder material.

It is the principal object of the present invention to provide a novel solvent-hectograph coating composition based upon cellulose ether binder materials which have excellent stability against increased viscosity and gelling during storage under ambient conditions.

It is another object of this invention to provide novel solvent-hectograph coating compositions based upon cellulose ether binder materials which are devoid of volatile organic solvents which are dangerous to the health or are objectionable in the atmosphere.

It is an advantage of the present invention that the use of the volatile solvents employed therein enables the use of smaller amounts of the cellulose ether binder material and larger amounts of the other ingredients, resulting in the production of more intense copies in the hectograph duplicating process.

These and other objects and advantages of the present invention will be apparent to those skilled in the art in the light of the present disclosure.

The present invention is based upon the discovery that the lower aliphatic esters having from 3 to 4 carbon atoms and a boiling point of from about 160° F. up to about 250° F. are excellent solvents for hectograph coating compositions based upon cellulose ether binder materials, substantial non-solvents for conventional hectograph dyes and conventional colorless dye precursors, and result in compositions which have excellent stability against objectionable increases in viscosity even when such compositions are exposed to relatively high humidity for prolonged periods of time.

It is not completely clear why or how the substitution of aliphatic esters such as ethyl acetate, ethyl propionate, isopropyl acetate, butyl acetate, methyl butyrate, etc., for the volatile solvents previously used in cellulose ether hectograph compositions overcomes the poor stability of such compositions but it appears that the aliphatic esters somehow tie-up or absorb the moisture which penetrates the composition from the atmosphere, preventing the moisture or absorbed water from affecting the cellulose ether binder material and/or the oils and hectograph imaging materials present in the composition. Attempts to obtain this result by adding dessicents or other water-miscible or water-soluble liquids to the prior-known compositions has failed to result in any improvement in stability against rapid increases in viscosity and gelling of the composition. Conversely, the use of the aliphatic esters causes a substantial reduction in the rate of viscosity increase so that the composition does not gel even after several weeks exposure to conditions of high ambient humidity.

The hectograph coating compositions of the present invention comprise 1 part by weight, based upon the solids content, of a cellulose ether binder material such as ethyl cellulose, hydroxyethyl cellulose, ethyl hydroxyethyl cellulose, or the like, from about 2 to about 4 parts by weight, based upon the solids content, of at least one oleaginous material which is substantially incompatible with the binder material and from about 4 to about 7 parts by weight, based upon the solids content, of one or more solid, particulate dyestuffs or colorless dye precursors which are substantially completely insoluble in the liquid coating vehicle but are highly soluble in the spirit solvents used in the hectograph duplicating process, namely aliphatic alcohols such as ethanol.

The oleaginous materials suitable for use according to the present invention preferably are semi-solid miscible mixtures which include semi-solid materials such as lanolin, petrolatum and hydrogenated vegetable oils mixed with liquid oily materials such as mineral oil, animal oils, certain vegetable oils and liquid esters, the mixtures being semi-solid and non-flowable at ordinary room temperatures, substantially incompatible with the cellulose ether binder material and substantial non-solvents for the soild dye or precursor particles used.

The present compositions have a solids content of from about 25% to about 45% and most preferably from about 30% to 40%, i.e., the solvent composition contains at least from about 55% to at most about 75% by weight of volatile organic solvent vehicle. Preferably the vehicle is a miscible mixture comprising a minor amount, i.e., from about 15% to about 35% by weight of the aliphatic ester and a major amount, i.e., from about 65% to about 85% by weight of a diluent which is a volatile liquid, a substantial non-solvent for the dyestuffs and for the cellulose ether binder material used, compatible with the aliphatic ester solvent and has an evaporation temperature higher than the aliphatic ester so as to evaporate from the coated composition after the evaporation of the aliphatic ester. Such diluents are conventional in the solvent hectograph art and include volatile liquids such as high-boiling mineral oils, paraffin oils, naphthenes, high-boiling cycloparaffins, cycloalkanes, and mixtures of these materials such as are available under the Trade Mark Naphtholite No. 4. The diluent preferably has a boiling point which is at least about 30° F. above the boiling point of the ester solvent, i.e., from about 200° F. to about 300° F. The viscosity of the present solvent hectograph compositions ranges between about 15 seconds Zahn and 40 seconds Zahn and most preferably between about 20 seconds Zahn and 25 seconds Zahn.

The following example is illustrative of the present invention and should not be considered to be limitative.

A hectograph coating composition is prepared by dissolving 1.0 part by weight of ethyl cellulose binder material having an ethoxyl content of over 50% in 5.0 parts by weight of isopropyl acetate and 15 parts by weight of Naphtholite No. 4, placing the resin solution in a ball mill and adding thereto 2.5 parts by weight of lanolin, 0.5 parts by weight of mineral oil, 0.5 parts by weight of rapeseed oil and 6.0 parts by weight of particulate hectograph dyestuff available from BASF under the Trade Mark Hectoschwartz G. The composition is ground for several hours and then removed from the mill and placed in an open container. The viscosity is 20 seconds Zahn.

Another composition is prepared at the same time in identical manner using identical ingredients and proportions except that the isopropyl acetate is replaced with toluol. The viscosity of this second composition is also 20 seconds Zahn.

The two compositions are allowed to stand exposed to ambient conditions of 50% relative humidity and over a period of less than two days the viscosity of the second composition had increased rapidly and the composition gelled and was unsuitable for coating purposes. However the viscosity of the first composition increased slowly to a value of only about 40 seconds Zahn after a period of three weeks and this composition was still perfectly suitable for its intended coating use after that period of time.

Conventional particulate hectograph dyestuffs and colorless dye precursors may be used as imaging materials according to the present invention. However the particular imaging material employed should be substantially dry, i.e., possess a moisture content no greater than about 5% based upon the total weight of the imaging material. Suitable dyes include Crystal Violet, Methyl Violet, Malachite Green and Hectoschwartz G. Suitable dye precursors include Crystal Violet Lactone and the precursors disclosed in U.S. Pat. No. 3,695,912. Such materials are substantially colorless but develop intense colors when contacted with an acidic material which may be present in the spirit duplicating fluid or on the copy sheet surface.

Hectograph transfer sheets are prepared by applying the present hectograph compositions to suitable flexible foundations such as paper and, more preferably, plastic film foundations such as 0.5 mil polyethylene terephthalate polyester, polypropylene, cellulose acetate butyrate, or other similar films. The coating weight and thickness may be varied within conventional ranges, and solidification of the coated dye layer is caused by evaporation of the aliphatic ester solvent followed by evaporation of the diluent.

Variations and modifications may be made within the scope of the claims and portions of the improvements may be used without others.

We claim:

1. Moisture-stable hectograph composition suitable for coating onto a flexible foundation and drying to form a pressure-transferable dye layer, comprising 1 part by weight of a cellulose ether binder material selected from the group consistng of ethyl cellulose, hydroxyethylcellulose and ethyl hydroxyethyl cellulose, from about 2 to about 4 parts by weight of at least one oleaginous material which is substantially incompatible with said binder material, from about 4 to about 7 parts by weight of particulate, spirit-soluble hectograph imaging material which possesses a moisture content no greater than about 5% based upon the total weight of said imaging material, and a sufficient amount of a volatile vehicle to render said composition coatable, said vehicle being a substantial non-solvent for said imaging material and comprising a miscible mixture comprising from 15% to 35% by weight of an aliphatic ester having from 3 to 6 carbon atoms which is a solvent for said binder material and from 85% to 65% by weight of a volatile liquid diluent which is a substantial non-solvent for said imaging material and for said binder material and has a boiling point which is between about 200° F. and 300° F. and is at least about 30° F. above the boiling point of said aliphatic ester.

2. A hectograph composition according to claim 1 in which said oleaginous material is a semi-solid mixture of at least one semi-solid oleaginous material and at least one liquid oil.

3. A hectograph composition according to claim 1 in which said aliphatic ester comprises isopropyl acetate.

4. A hectograph composition according to claim 1 in which said volatile liquid diluent comprises naphthenes.

5. A hectograph composition according to claim 1 in which said cellulose ether is ehtyl cellulose having an ethoxyl content of more than 50%.

6. A hectograph composition according to claim 1 in which said imaging material comprises a substantially dry hectograph dyestuff.

7. Process for producing a pressure-sensitive hectograph transfer element comprising the steps of (a) producing a moisture-stable hectograph coating composition by mixing together 1 part by weight of a cellulose ether binder material, from about 2 to 4 parts by weight of at least one oleaginous material which is substantially incompatible with said binder material, from about 4 to 7 parts by weight of particulate, spirit-soluble hectograph imaging material which possesses a moisture content no greater than about 5% based upon the total weight of said imaging material, and a sufficient amount of a volatile vehicle to render said composition coatable, said vehicle being a substantial non-solvent for said imaging material and comprising a miscible mixture comprising from 15% to 35% by weight of an aliphatic ester having from 3 to 6 carbon atoms which is a solvent for said binder material, and from 85% to 65% by weight of a volatile liquid diluent which is a substantial non-solvent for said imaging material and for said binder material and has a boiling point which is between about 200° F. and 300° F. and is at least about 30° F. above the point of said aliphatic ester.

(b) applying said composition as a uniform thin layer over a flexible foundation, and (c) solidifying said layer by first evaporating said aliphatic ester and then evaporating said volatile liquid diluent to form a dry, pressure-transferable hectograph layer on said foundation.

8. Process according to claim 7 in which said volatile liquid diluent comprises naphthenes.

9. Process according to claim 7 in which said flexible foundation comprises a plastic film.

10. Pressure-sensitive transfer element produced according to the process of claim 7.

* * * * *

UNITED STATES PATENT AND TRADEMARK OFFICE
CERTIFICATE OF CORRECTION

PATENT NO. : 4,184,003

DATED : January 15, 1980

INVENTOR(S) : KNABE, H.; SCHLOTZHAUER, A. T.; SCOTT, M. A.

It is certified that error appears in the above-identified patent and that said Letters Patent are hereby corrected as shown below:

Under references cited "3,177,066" should read --3,177,086--;

Col. 1, line 61, "3 to 4" should read --3 to 6--.

Signed and Sealed this

*Seventeenth* Day of *June 1980*

[SEAL]

*Attest:*

SIDNEY A. DIAMOND

*Attesting Officer*

*Commissioner of Patents and Trademarks*